(12) United States Patent
Bertuccio et al.

(10) Patent No.: US 8,064,154 B2
(45) Date of Patent: Nov. 22, 2011

(54) DEVICE FOR PROTECTING OPTICAL AND/OR ELECTRONIC APPARATUSES, SPACE TELESCOPE COMPRISING SAID DEVICE, AND DEVICE FOR REMOVABLY OCCLUDING AN APERTURE

(75) Inventors: Enrico Domenico Bertuccio, Turin (IT); Corrado Gennaro, Turin (IT)

(73) Assignee: Thales Alenia Space Italia SpA (IT)

( * ) Notice: Subject to any disclaimer, the term of this patent is extended or adjusted under 35 U.S.C. 154(b) by 189 days.

(21) Appl. No.: 12/508,767

(22) Filed: Jul. 24, 2009

(65) Prior Publication Data

US 2010/0284078 A1 Nov. 11, 2010

(30) Foreign Application Priority Data

Jul. 25, 2008 (EP) .................................... 08425508

(51) Int. Cl.
*B64G 1/22* (2006.01)
*E06B 3/48* (2006.01)
(52) U.S. Cl. ...... 359/894; 359/513; 160/115; 244/171.7
(58) Field of Classification Search .................. 359/507, 359/611–613, 513–514, 739, 894; 160/131–132, 160/186–187, 229.1–235, 212–213, 185, 160/115, 119; 49/36, 50, 371, 399, 400, 49/477.1, 191; 244/171.7
See application file for complete search history.

(56) References Cited

U.S. PATENT DOCUMENTS

| | | | |
|---|---|---|---|
| 2,938,749 A * | 5/1960 | Podolan et al. .......... 296/146.11 |
| 2,995,997 A | 8/1961 | Nieuwenhoven |
| 3,183,776 A | 5/1965 | Wallis |
| 3,216,760 A * | 11/1965 | Buchwald ....................... 296/76 |
| 3,850,504 A | 11/1974 | Bisbee |
| 4,045,117 A * | 8/1977 | Lerner ......................... 359/612 |
| 4,295,706 A * | 10/1981 | Frost ............................. 359/611 |
| 4,460,030 A | 7/1984 | Tsunemura et al. |
| 4,935,129 A * | 6/1990 | Wang ............................ 210/131 |
| 5,035,463 A * | 7/1991 | Kato et al. .................... 296/223 |
| 5,258,874 A | 11/1993 | Bajat et al. |
| 5,631,772 A * | 5/1997 | Mizukawa .................... 359/511 |
| 7,464,900 B2 * | 12/2008 | Clark et al. ................ 244/171.7 |
| 7,557,995 B1 * | 7/2009 | Lloyd ........................... 359/642 |
| 7,828,450 B2 * | 11/2010 | Riley ............................ 359/612 |
| 2004/0201896 A1 | 10/2004 | Lundgren et al. |

* cited by examiner

*Primary Examiner* — Mark Consilvio
(74) *Attorney, Agent, or Firm* — Baker & Hostetler LLP

(57) ABSTRACT

A protective device for optical and/or electronic apparatuses, in particular space telescopes, is described, wherein the device is such as to removably close an aperture, through which apparatuses may be accessed, the device being such as to achieve a first and second operating configuration, respectively, for allowing or inhibiting access to apparatuses through aperture. The device includes a supporting structure having at least one supporting beam, which is transversely positioned with respect to aperture; a plurality of covering elements comprising at least a pair of elements, which are rotatably coupled to the same supporting beam; and actuation means for rotating the covering elements between a first and second angular position, in order for the device to attain the first or second operating configuration, respectively, wherein, in the second operating configuration, the covering elements are such as to define together a screen for aperture.

14 Claims, 6 Drawing Sheets

DEVICE FOR PROTECTING OPTICAL AND/OR ELECTRONIC APPARATUSES, SPACE TELESCOPE COMPRISING SAID DEVICE, AND DEVICE FOR REMOVABLY OCCLUDING AN APERTURE

CROSS-REFERENCE TO RELATED APPLICATIONS

This application claims priority to foreign European Patent Application EP 08425508, filed Jul. 25, 2008, the disclosure of which is incorporated herein by reference in its entirety.

FIELD OF THE INVENTION

The present invention relates to a device for protecting optical and/or electronic apparatuses, in particular for space telescopes and more in particular it relates to a protective device, for optical and/or electronic apparatuses. The present invention further relates to a space telescope and may be generally extended to a device for removably occluding an aperture.

BACKGROUND OF THE INVENTION

There is a need to efficiently and reliably protect sensible optical and/or electronic apparatuses, which are housed on board of satellites and generally on space vehicles. For example, in the particular field of satellite space telescopes, there is a need to protect sensible parts pertaining to optics of said telescopes, both from undesirable contaminations by materials which may for example take place during launch or during initial orbit injection phase of satellite, or when crossing a region of space having a high density of space detritus, and for shielding the same in a selective way from undesirable and/or damaging radiations, for example direct solar radiation.

Known art solutions envisage the use of a tubular screen, called "aperture baffle", which is disposed along the optical axis of telescope and which has an end aperture, to which a transversal closing device is associated, such as for example a circular port, which is rotatably hinged to the tubular screen and may be rotated out of the viewing field of telescope, during active phase of use of telescope. This solution is for example implemented on board the X-ray telescope called XMM, developed by ESA (European Space Agency).

Other known solutions envisage use of inflatable closing devices, such as for example the solution described in U.S. Pat. No. 3,850,504, or use of bistable rotatable closing devices, which may rotate around an axis parallel to optical axis, for moving between a closing position and an opening position, such as for example the solution described in U.S. Pat. No. 5,258,874.

The above indicated solutions of the known art have various drawbacks in terms of reliability, efficiency, structural complexity (for example, they require a high number of actuators), or bulk, to the point that there seems no reasonable use, in terms of feasibility and economic viability, of such solutions in so called "Large Telescopes"—space telescopes, in which the diameter of section to be protected generally exceeds approximately 4 meters, especially when, as in the so called "Mirror" telescopes, two protective devices are required, which are associated to upper part and lower part of optical system, respectively.

BRIEF SUMMARY OF THE INVENTION

The object of the present invention is to overcome said drawbacks with reference to known art and provide an efficient and relatively economical solution, with reduced bulk and relatively reduced structural complexity.

Such drawbacks are overcome by an embodiment of the present invention, which provides a protective device for optical and/or electronic apparatuses, in particular for space telescopes, wherein the device is provided for removably closing an aperture, through which apparatuses may be accessed, the device being such as to achieve a first and second operating configuration, for allowing or inhibiting, respectively, access to apparatuses through said aperture, said protective device including a supporting structure having at least one supporting beam, which is transversely positioned with respect to said aperture; a plurality of covering elements including at least a pair of elements, each covering element of said pair of elements having an internal lateral edge which is rotatably coupled to the supporting beam and an opposed external lateral free edge; and; actuation means for rotating the covering elements of said pair of elements about the supporting beam between a first and second angular position, in order for the device to attain the first or second operating configuration, respectively, wherein, in the second operating configuration, the covering elements are such as to define, together, a screen for aperture . . . The present invention also relates to a space telescope having at least one said protective device.

Other embodiments of the invention are described in further in the claims appended herein.

The present invention also relates to a device for removably occluding an aperture, the device being such as to achieve a first and second operating configuration, respectively, for leaving said aperture at least partially open and for closing the same aperture, said occlusion device including a supporting structure having at least one supporting beam, which is transversely positioned with respect to said aperture; a plurality of covering elements having at least a pair of elements, which are rotatably coupled to the same supporting beam; and actuation means for rotating the covering elements between a first and second angular position, in order for the device to attain the first or second operating configuration, respectively, wherein, in the second operating configuration, the covering elements are such as to define, together, a screen for closing aperture.

BRIEF DESCRIPTION OF THE DRAWINGS

Further features and advantages of present invention will be more clearly understood by reading the following description of preferred and non limiting exemplary embodiments, in which.

DETAILED DESCRIPTION

Figure 1:
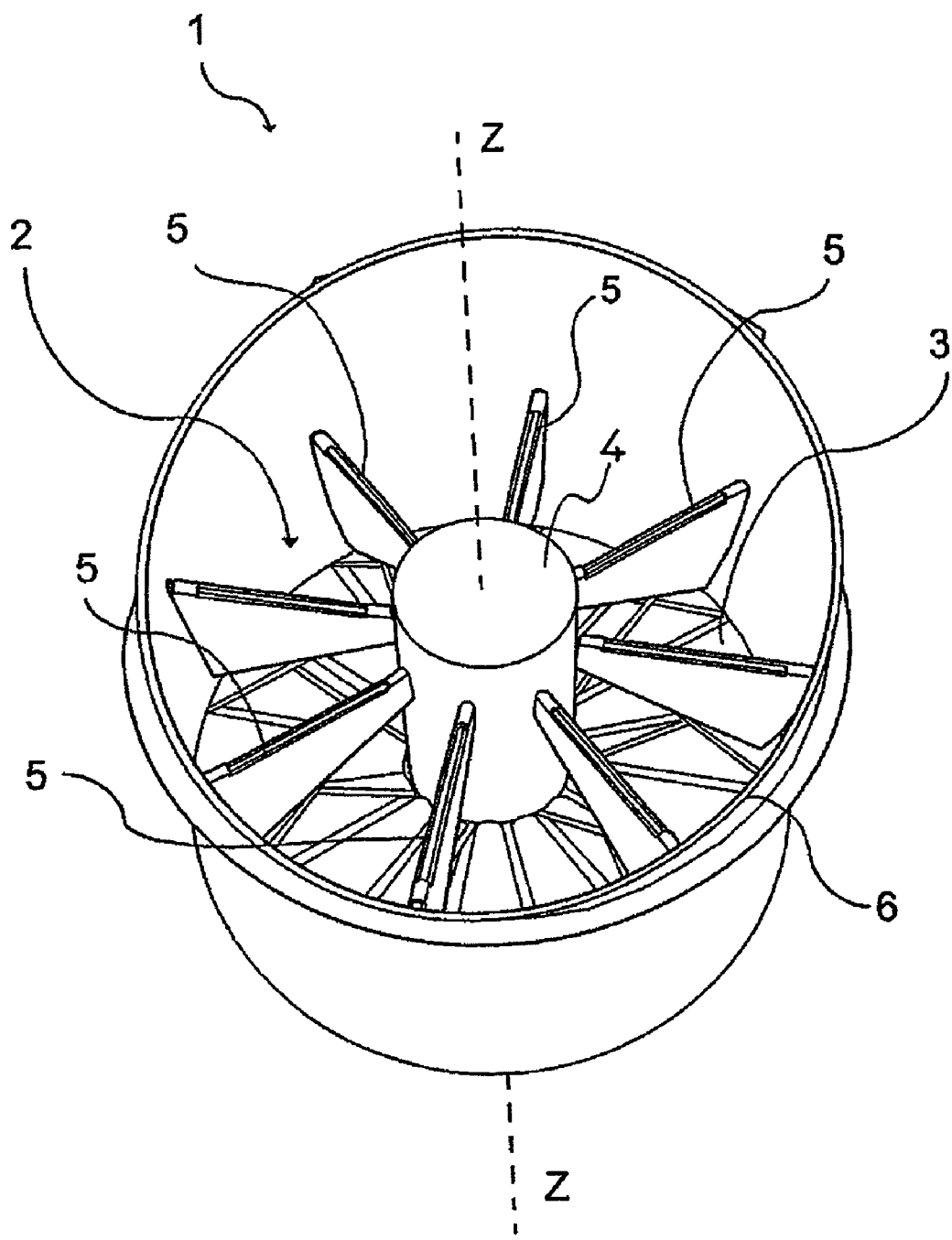
FIG. 1 shows a perspective view of a protective device according to a presently preferred embodiment of present invention, in which protective device is shown in a first operating configuration.

In the figures, same or similar elements are provided with the same reference numerals.

With reference to above said figures, 1 generally indicates a protective device according to a presently preferred embodiment of present invention. Protective device 1 of this example is in particular a screen device for optics of space telescopes, and preferably for optics of so called Large Telescopes. Therefore, the specific protective device 1 described herein is provided for installation on board of satellites and generally on board of space vehicles, in order to protect optics of telescopes provided on board said satellite or more generally on a space vehicle.

In any case, it is to be noted that generally a protective device 1 according to present invention may be employed also for protecting optical and/or electronic devices, other than the optics of a space telescope, since they may be for example used for protecting telecommunications equipments or other instruments, which are provided on board of satellites or space vehicles or more generally also in sectors, other than the space sector, for example for marine, aeronautical or terrestrial applications. Finally, it is to be noted that a protective device according to present invention may be generally employed for various other applications, such as for an occlusion device for removably closing an aperture.

Figure 2:
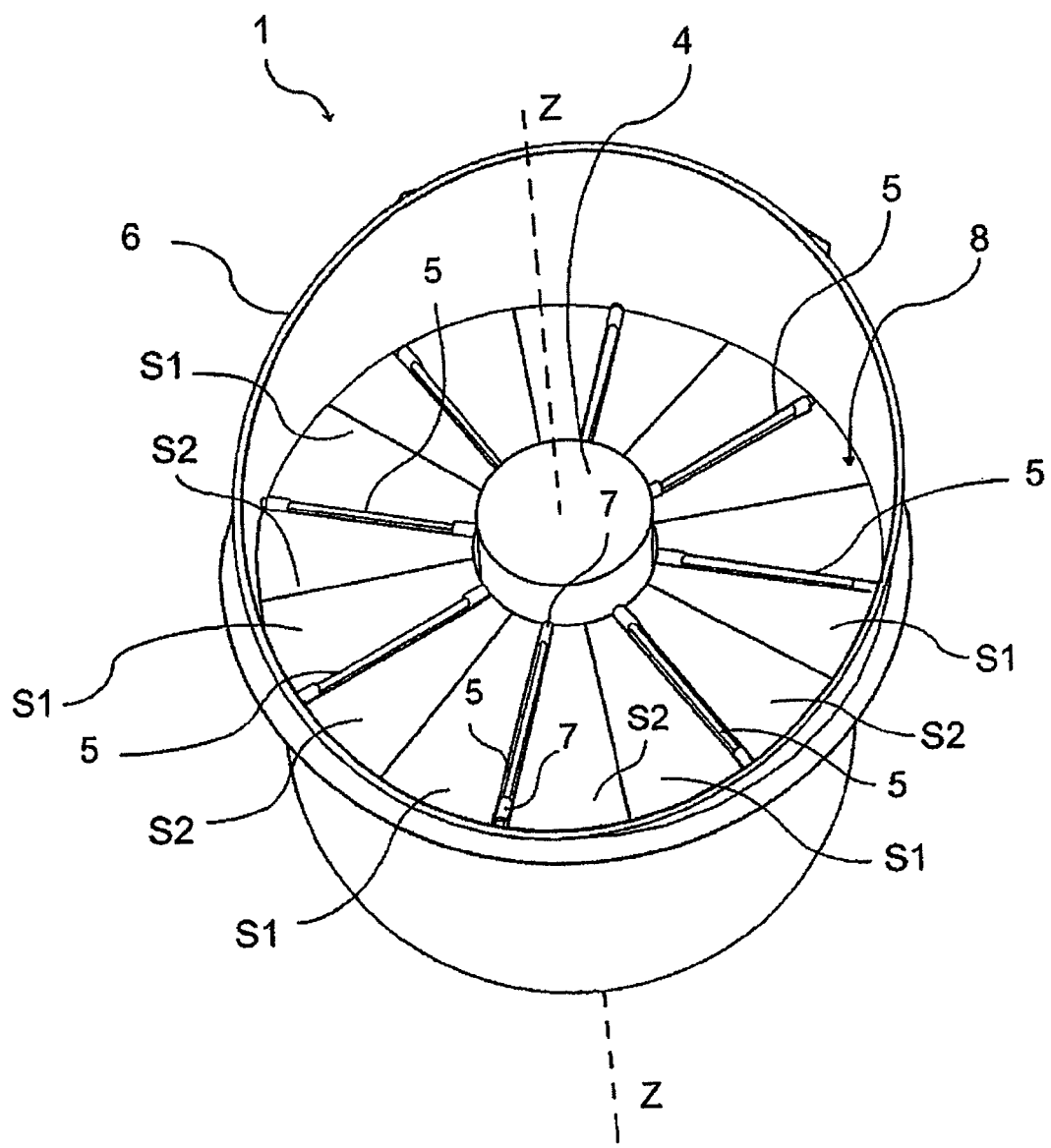
FIG. 2 shows a perspective view of protective device of FIG. 1, in which protective device is shown in a second operating configuration.
Figure 3:
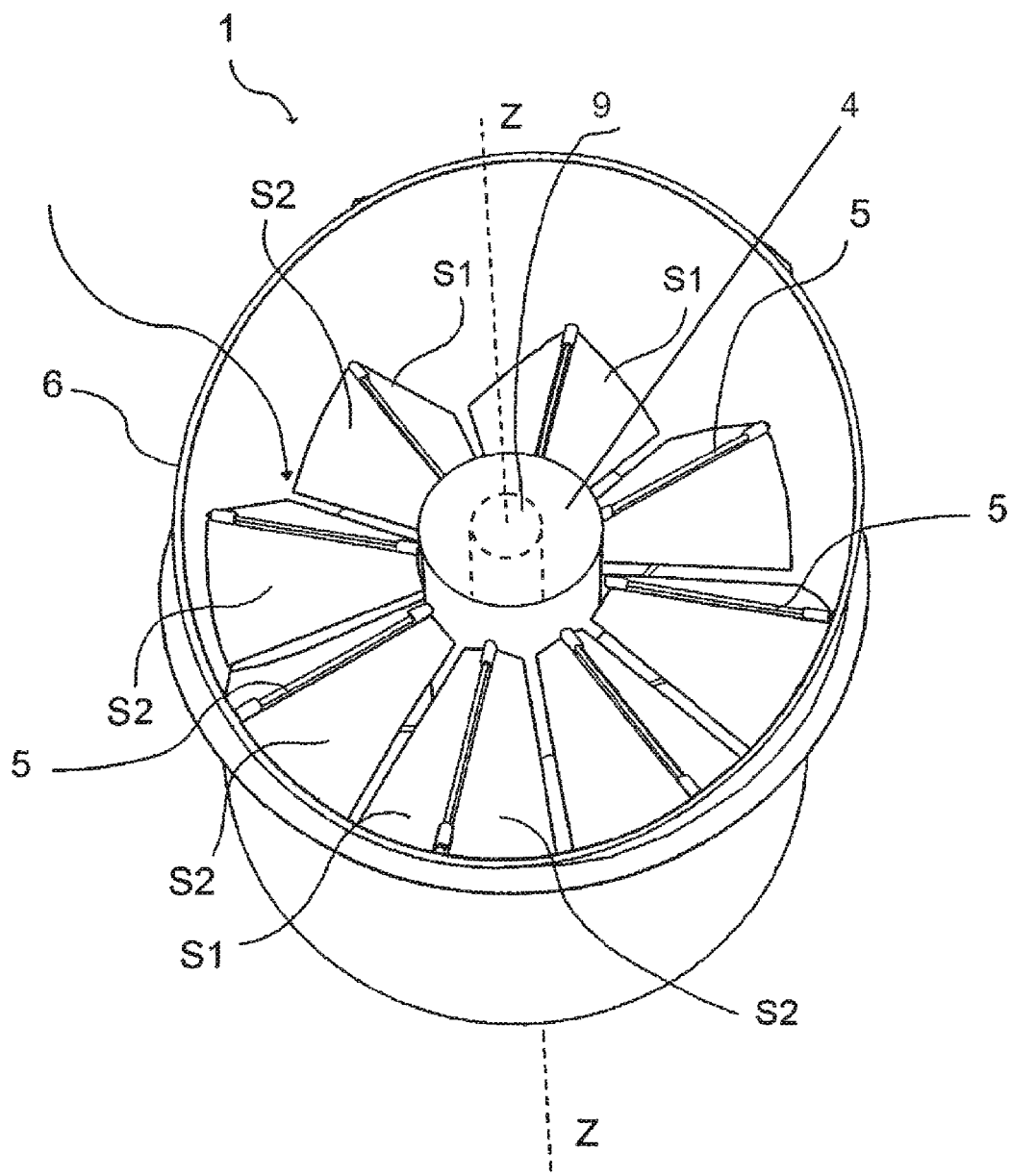
FIG. 3 shows a perspective view of protective device of FIG. 1, in which protective device is shown in a third operating configuration.

In the particular example described herein, protective device 1 is such as to removably close an aperture 2, through which equipment, such as optics 3 of a space telescope, for example a mirror-type or X-ray telescope, may be accessed. In practice, aperture 2 allows space telescope to receive an optical radiation entering from the outside, which radiation may cooperate with optics 3 of telescope, for example for space observations through said telescope, during its normal operation. In the particular embodiment described herein, aperture 2 is a circular aperture, whereas in other embodiments, aperture 2 may be differently shaped (see FIG. 10). In FIG. 1-3, Z-Z is the axis of circular aperture 2.

Protective device 1 is such as to attain a first operating configuration, or non-protective configuration, shown in FIG. 1, wherein device 1 allows accessing optics 3 through aperture 2, in this example, for allowing such optics to receive incoming optical radiation.

The protective device 1 may further attain a second operating configuration, or protective configuration, shown in FIG. 2, wherein protective device 1 occludes aperture 2, for preventing access of optics 3 through aperture 2, for example for protecting such optics from exposition to potential damaging factors, like contamination by external agents (space dust, fuel residuals) or from optical radiation which may damage the same optics (for example direct solar radiation).

Protective device 1 comprises a support structure 4, 5, 6, comprising at least a supporting beam 5, which is transversely positioned with respect to aperture 2. In the particular embodiment shown, support structure 4, 5, 6 comprises a plurality of radial beams 5, transversely positioned with respect to circular aperture 2, and more precisely eight radial beams 5.

Preferably, as in the example described, when aperture 2 is circularly shaped, support structure 4, 5, 6 moreover comprises a central supporting element 4, which is positioned along Z-Z axis of aperture 2 and a tubular collar 6, which surrounds aperture 2. Supporting beams 5 comprise a first end portion, coupled to central supporting element 4, and an opposed second end portion, coupled to tubular collar 6, extending from central element 4 to tubular collar 6.

Protective device 1 moreover comprises a plurality of covering elements S1, S2, said plurality comprising at least a pair of covering elements S1, S2, which are rotatably coupled to a same supporting beam 5. In the particular example shown, protective device 1 comprises eight pairs S1, S2 of covering elements, wherein covering elements of each pair S1, S2 are rotatably coupled, for example by means of one or more cylindrical hinges, to a respective supporting beam 5.

Preferably, each covering element of pair S1, S2 is hinged to a supporting beam 5 by means of a pair of cylindrical hinges 7, preferably of the type having radial clearance, so that each covering element S1, S2 has an internal lateral edge (with respect to pair S1, S2) which is fixed to supporting beam 5 and an opposed external lateral free edge 21, 22. In the embodiment shown in FIG. 1-8, lateral internal and external edges are radial edges.

In a particularly preferred embodiment, covering elements S1, S2 are panels, which are substantially opaque with respect to solar radiation and which have a multilayered structure (not shown in figures), with a central layer of aluminum alloy and preferably a honeycomb structure, which is interposed between two lateral plates, made of carbon fibers. In the particular example shown, it may be noted that the shape of each covering element S1, S2 is a circular sector portion interposed between two radiuses of said sector. From now on, in the present description, covering elements S1, S2 will be called panels, without introducing any limitation.

Protective device 1 further comprises actuator means 9 for rotating panels S1, S2 between a first angular position and second angular position, respectively, for positioning protective device 1 in the non-protective operating configuration (shown in FIG. 1) and in the protective operating configuration (shown in FIG. 2).

On the other hand, FIG. 3 shows an intermediate operating condition, which is attained by protective device 1 at transition from protective operating configuration to non-protective operating configuration and vice-versa. Preferably, between first and second angular position of panels S1, S2, each of them rotates by approximately 90 degrees. In the example in the description, in first angular position, panels S1, S2 are substantially perpendicular to plane of aperture 2, whereas in second angular position, they are substantially parallel to plane of aperture 2, in order to create, in combination with each other, a continuous closing screen 8 (FIG. 2) for aperture 2. Such continuous screen 8 of this particular example, shown in figures, is shaped like a circular sector comprised of 16 covering elements S1, S2, which are mutually adjacent and consecutive.

Actuator means 9 of panels S1, S2 preferably comprise rotational actuators, more preferably of the pneumatic type. However, other types of actuator means may be provided, such as for example electric or electromagnetic motors. Such actuator means are preferably housed inside central element 4, which is therefore at least partially hollow.

In a particularly advantageous embodiment, protective device 1 moreover comprises an inflatable stiffening system for continuous closing screen 8, which may be activated for stiffening screen 8, once protective device 1 has attained its protective configuration.

Figure 4:
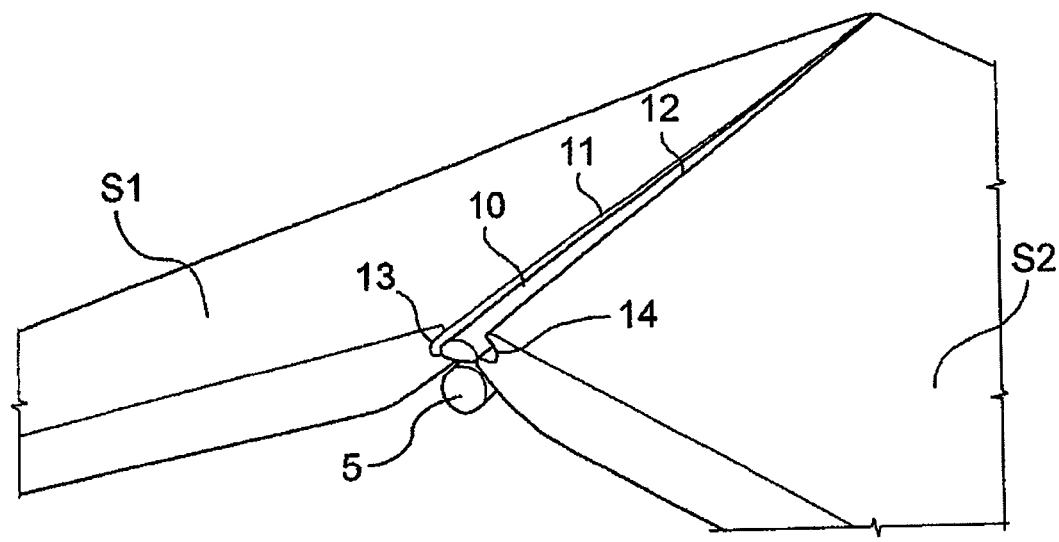
FIG. 4 shows a perspective and sectional view of a magnified detail of protective device of FIG. 1.
Figure 5:
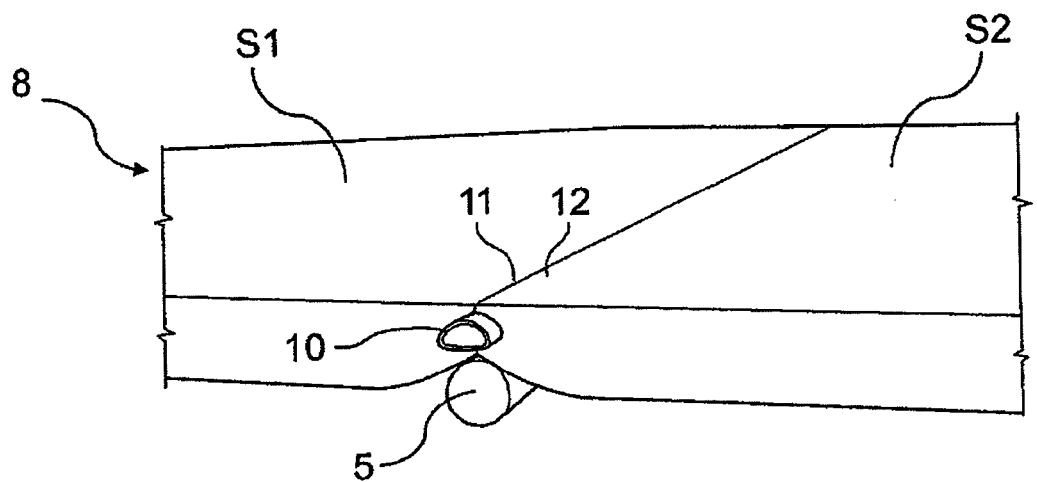
FIG. 5 shows a magnified detail of FIG. 4, when protective device of FIG. 1 is in second operating configuration.

As shown in FIGS. 4 and 5, inflatable stiffening system preferably comprises tubular elastic conduits 10, which run parallel to supporting beams 5 and which may be pressurized in order to elastically deform and dilate. Advantageously, panels of a pair S1, S2 are each provided with an edge 11, 12, which is in an internal position with respect to same pair (i.e., it is directed towards supporting beam 5), and which is provided with a recess 13, 14. As shown in FIG. 5, when protective device 1 reaches protective configuration, the two internal edges 11, 12 of panels S1, S2 may cooperate with each other, in order to define a channel for receiving the tubular conduit 10. By pressurizing this conduit 10 by means of a suitable fluid, for example a mono-phase gas, conduit 10 elastically deforms and expands inside recesses 13 and 14, in order to cooperate with panels S1, S2, exerting a pushing force on same panels, which therefore have a trend towards a slightly increased mutual distance. Such separation is for instance accomplished by using hinges 7 (FIG. 2), provided with a radial clearance, for connecting panels S1, S2 to supporting beams 5.

In a particularly preferred embodiment, tubular conduits 10 have a section which is approximately shaped like a triangle with rounded corners and curved sides.

Figure 6:
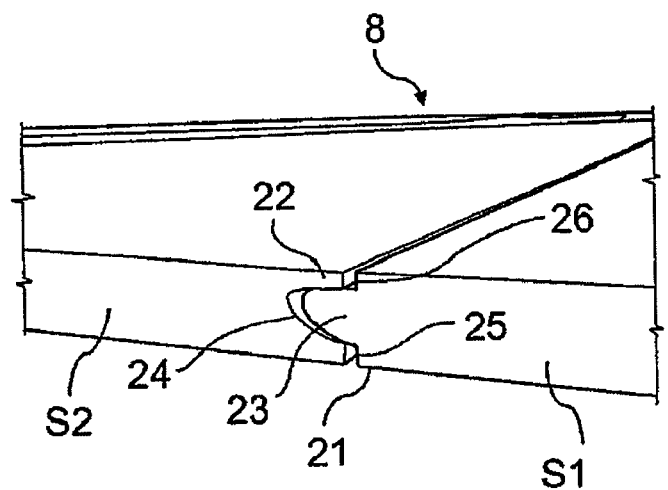
FIGS. 6, 7 and 8 show other perspective views of magnified details of protective device 1.
Figure 7:
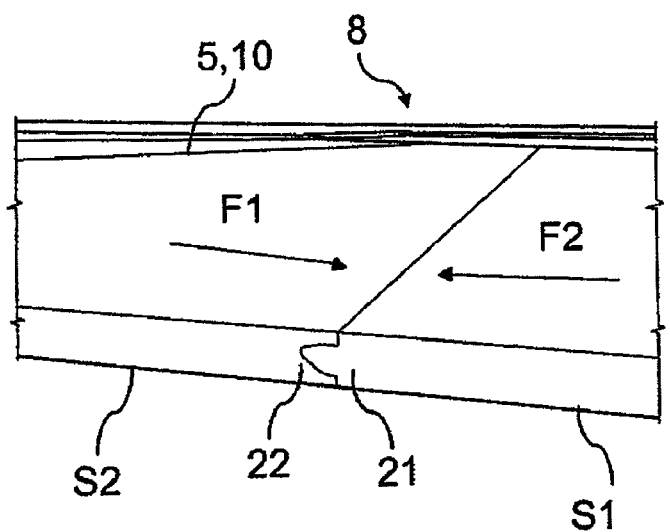

As shown in FIGS. 6 and 7, it is possible to advantageously envisage external edges 21, 22 of a pair of panels S1, S2 which are complementarily shaped with respect to respective external edges of panels of adjacent pairs S1, S2. In the present description, the external edges 21, 22 of panel S1, S2 are meant to be the edges of same panel, which, in the protective condition of protective device 1, directly face the edge of panel S1, S2 of an adjacent pair of panels.

Therefore, in the protective configuration, by suitably sizing panels S1, S2, it is possible to interlock to each other internal panels of two adjacent pairs, as shown in FIG. 6. However, in order to allow for rotation and successive interlocking of such panels S1, S2, it is necessary, as shown in FIG. 6, to provide a minimum clearance between external facing borders 21, 22 of panels S2, S1 of two adjacent pairs of panels. Advantageously, by providing an inflatable stiffening system of above said type, once the protective device 1 has achieved the second operating condition and inflatable conduits 10 are pressurized, it is possible to push in opposite directions, as shown by arrows F1, F2, two adjacent panels S1, S2 of two adjacent pairs of panels, in order to lock said panels S1, S2 against each other, creating a robust continuous closing screen 8.

In a particularly advantageous embodiment, shown in FIG. 6, of the two external edges 21, 22, which have to be facing each other in the second operating configuration, one has a continuous protrusion 23 extending along edge 21, and the other comprises a continuous recess 24, extending along edge 22, which is counter-shaped with respect to protrusion 23. More preferably, protrusion 23 has an asymmetrical profile and preferably centrally protrudes with respect to two lateral linear shoulders 25, 26. More preferably, protrusion 23 has a profile corresponding to a circumference evolvent.

Figure 8:
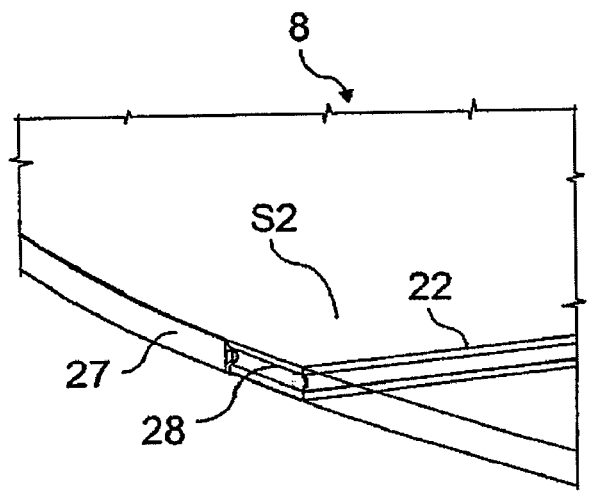

With reference to FIG. 8, in a particularly advantageous embodiment, in order to further increase resistance of continuous screen 8 in the protective configuration, it is possible to provide the inflatable stiffening system with an inflatable peripheral conduit 27, which is associated with internal edge of aperture 2, for example by fixing it inside collar 6. This peripheral conduit 27 may be pressurized, when protective device 1 has achieved protective configuration, in order to cooperate with external peripheral edge of screen 8. In this embodiment it is possible that peripheral edges of panels S1, S2 advantageously have a recess 28, so that peripheral edge of screen 8 is provided with a continuous peripheral recess 28 which may cooperate with peripheral inflatable conduit 27, when the latter is pressurized by a suitable fluid. In a particularly preferred embodiment, the inflatable peripheral conduit 27 has a substantially "Ω"-shaped section, with a flat non inflatable band, which faces towards internal walls of collar 6 and an inflatable central part, which is fixed to the flat band and has a substantially circular section.

It is to be noted that in order to pressurize conduits of the inflatable stiffening system 10, 27, it is possible to provide a single pressurizing fluid tank or envisage an independent pressurization of various conduits.

In the following, an example of operation of protective device 1 will be briefly described, with specific reference to the case, where device 1 is installed on board a space telescope, in order to protect the optics of such a telescope.

During launch phase and initial orbit injection of satellite, it is important to protect optics against contaminating agents, such as propellant residuals. For this reason, during these phases, protective device 1 will be in protective condition (FIG. 2), wherein panels S1, S2 are oriented in order to form a protective screen 8, which inhibits contact between optics and such agents. Since during these phases, screen 8 is subject to heavy launch stresses, it is particularly advantageous to stiffen screen 8 by pressurizing said inflatable stiffening system.

Once in orbit, the inflatable stiffening system may be depressurized, allowing the protective device to attain its non-protective configuration (FIG. 1), for example during normal operations of telescope, in order to undertake space observations.

At the end of observation phase, in order to protect optics from direct solar radiation or space detritus, the protective device 1 may be returned to its protective configuration. Generally, once the satellite has been put into orbit, it will no longer be necessary to activate the inflatable stiffening system, since screen 8 will usually be free of loads and usually no particular stress will act upon it. However since this stiffening system is also a sealing system, it may be decided to pressurize the system in particularly hostile environments, for example if presence of high density of space detritus is detected.

Based on above said description, one may understand how a protective device of above said type is capable of fully achieve intended goals, overcoming the drawbacks of devices of the known art. The proposed solution is particularly convenient in terms of mass, efficiency and economical aspects.

Figure 9:
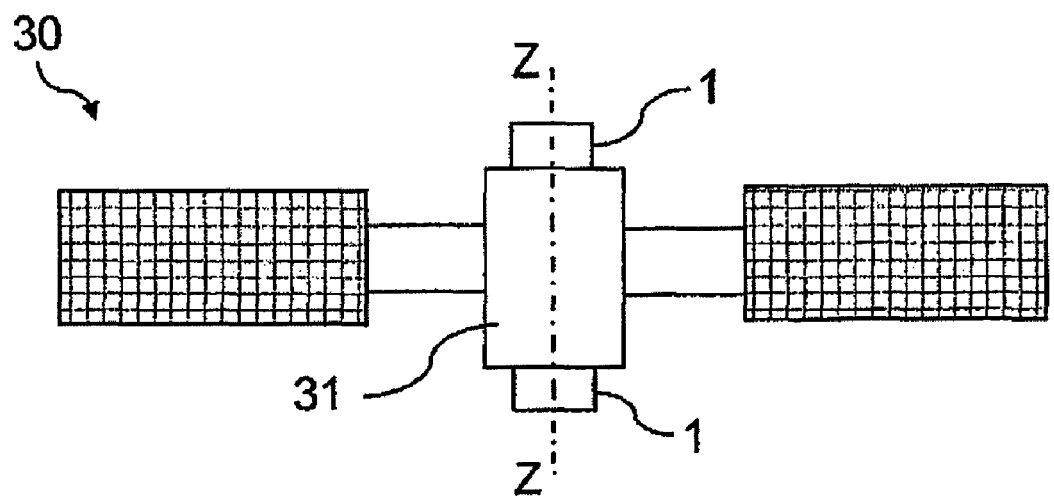
FIG. 9 shows a schematic plan view of a satellite with space telescope, of the mirror type, comprising two protective devices according to present invention.

The proposed solution is particularly advantageous when, as shown in FIG. 9, two protective devices 1 of the above said type need to be associated to a satellite 30 comprising a space telescope 31, for example of the mirror type, for the upper portion and lower portion of telescope optics, respectively.

The skilled in the art, in order to achieve specific and contingent needs, may introduce various modifications and variations to above said protective device, which all are contained in the scope of the invention, as defined in appended claims.

Figure 10:
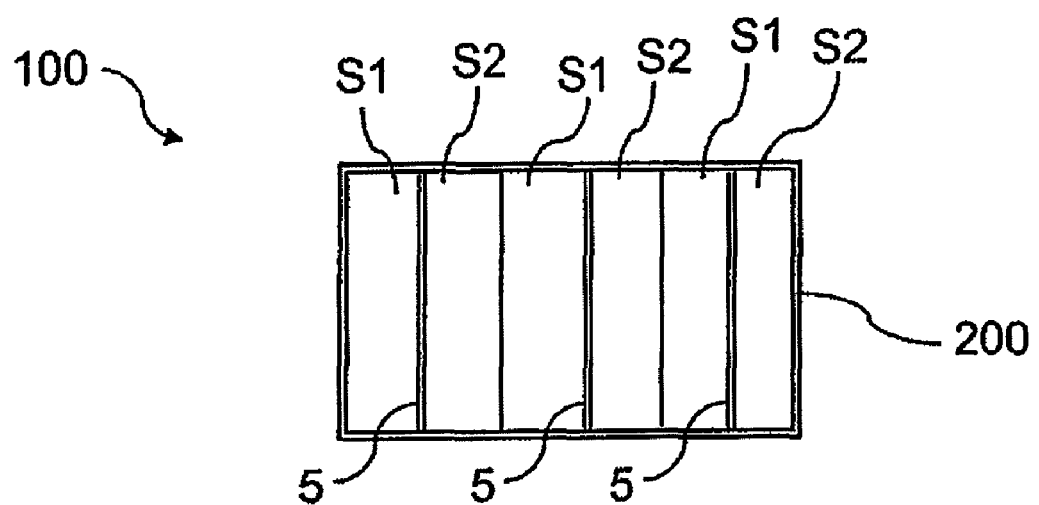
FIG. 10 shows a schematic plan view of a possible modified embodiment of the protective device according to present invention.

For example, although a device for selectively closing a circular aperture has been described, it is to be noted that, with reference to FIG. 10, the teachings of the present invention may be applied to devices of an analogous type, for removably closing differently shaped apertures. For example, FIG. 10 schematically shows a device 100 for removably closing a rectangular aperture 200, wherein the supporting beams 5 are parallel to each other and each supporting beam 5 is rotatably coupled to a pair of rectangularly shaped panels S1, S2. Moreover, all of above teachings referring to an inflatable stiffening system may be applied, with slight modifications, which are all known to the skilled in the art, to the protective device 100 of FIG. 10.

What is claimed is:

1. Protective device for optical and/or electronic apparatuses wherein the device is provided for removably closing an aperture, through which apparatuses may be accessed, the device being such as to achieve a first and second operating configuration, for allowing or inhibiting, respectively, access to apparatuses through said aperture, said protective device comprising:
   a supporting structure comprising at least one supporting beam, which is transversely positioned with respect to said aperture;
   a plurality of covering elements comprising at least a pair of elements, each covering element of said pair of elements having an internal lateral edge which is rotatably coupled to the supporting beam and an opposed external lateral free edge;
   actuation means for rotating the covering elements of said pair of elements about the supporting beam between a first and second angular position, in order for the device to attain the first or second operating configuration, respectively, wherein, in the second operating configuration, the covering elements are such as to define, together, a screen for said aperture; and
   an inflatable stiffening system, which may be activated for stiffening the screen in the second operating configuration.

2. Protective device according to claim 1, comprising a plurality of said supporting beams and a plurality of pairs of covering elements, wherein each pair comprises covering elements, which are rotatably coupled to a respective beam.

3. Protective device according to claim 2, wherein said aperture is a circular aperture and wherein said supporting beams are radially positioned with respect to said aperture.

4. Protective device according to claim 3, wherein the supporting means moreover comprise a central supporting element, which is axially positioned with respect to said aperture, and a tubular collar, surrounding said aperture, wherein said supporting beams extend from said central supporting element to said collar.

5. Protective device according to claim 1, wherein covering elements, in the second angular position, are disposed on a plane, which is substantially parallel to said aperture and in first angular position, are perpendicular with respect to said plane.

6. Protective device according to claim 1, wherein the inflatable stiffening system comprises at least an elastic conduit, which extends in parallel to said beam, and which, in the second operating configuration, is interposed between said pair of covering elements and may be pressurized, in order to dilate between elements of said pair.

7. Protective device according to claim 6, comprising a first and second adjacent pair of covering elements, wherein said first pair of covering elements are rotatably coupled to a first supporting beam and said second pair of covering elements are rotatably coupled to a second supporting beam, the covering elements being shaped in such a way that two elements of said first and second pairs of covering elements, which are interposed between said first and second supporting beam, are provided with a first edge and second edge, which are facing each other, in order to mutually interfere, when the device attains the second operating configuration.

8. Protective device according to claim 7, wherein said first and said second edge are complementarily shaped in order to interlock with each other in second operating configuration.

9. Protective device according to claim 8, wherein one of said edges is provided with a continuous protrusion, extending along said edge and the other one of said edges is provided with a continuous recess extending along said edge.

10. Protective device according to claim 1, wherein the inflatable stiffening system further comprises a peripheral inflatable conduit, which is associated to an internal edge of aperture, and which may be pressurized, when the protective device has achieved the second operating configuration, in order to cooperate with an external peripheral edge of screen.

11. Space telescope comprising at least one protective device according to claim 1.

12. Occlusion device for removably closing an aperture, the device being such as to achieve a first and second operating configuration, respectively, for leaving said aperture at least partially open and for closing the same aperture, said occlusion device comprising:
   a supporting structure comprising at least one supporting beam, which is transversely positioned with respect to aperture;
   a plurality of covering elements comprising at least a pair of elements, which are rotatably coupled to the same supporting beam;
   actuation means for rotating the covering elements between a first and second angular position, in order for the device to attain the first or second operating configuration, respectively, wherein, in the second operating configuration, the covering elements are such as to define, together, a screen for closing aperture; and
   an inflatable stiffening system, which may be activated for stiffening the screen in the second operating configuration.

13. Occlusion device according to claim 12, comprising a plurality of said supporting beams and a plurality of pairs of covering elements, each pair comprising covering elements, which are rotatably coupled to a respective beam.

14. Occlusion device according to claim 12, further comprising an inflatable stiffening system, which may be activated for stiffening the screen in the second operating configuration.

* * * * *